(12) United States Patent
Smith

(10) Patent No.: US 6,391,245 B1
(45) Date of Patent: May 21, 2002

(54) METHOD FOR CREATING THREE-DIMENSIONAL OBJECTS BY CROSS-SECTIONAL LITHOGRAPHY

(75) Inventor: Jeffrey M. Smith, Dalton, MA (US)

(73) Assignee: EOM Technologies, L.L.C., Pittsfield, MA (US)

( * ) Notice: Subject to any disclaimer, the term of this patent is extended or adjusted under 35 U.S.C. 154(b) by 0 days.

(21) Appl. No.: 09/290,925

(22) Filed: Apr. 13, 1999

(51) Int. Cl.⁷ .............................................. B29C 35/04
(52) U.S. Cl. ........................................ 264/401; 716/21
(58) Field of Search ............................ 716/21; 264/401

(56) References Cited

U.S. PATENT DOCUMENTS

| | | | |
|---|---|---|---|
| 4,041,476 A | 8/1977 | Swainson | 365/119 |
| 4,575,330 A | 3/1986 | Hull | 425/174.4 |
| 5,015,424 A | 5/1991 | Smalley | 264/401 |
| 5,061,049 A | 10/1991 | Hornbeck | 347/240 |
| 5,263,130 A | 11/1993 | Pomerantz et al. | 345/418 |
| 5,461,411 A | 10/1995 | Florence et al. | 347/240 |
| 6,051,179 A | * 4/2000 | Hagenau | 264/401 |

OTHER PUBLICATIONS

How It Works—Internet Articles, Texas Instruments, Inc., 1997, Entire Document.
Digital Light Processing™ for High–Brightness, High–Resolution Applications, Larry J. Hornbeck, Texas Instruments, Inc., Feb. 1997, Entire Document.
From Cathode Rays to Digital Micromirrors: A History of Electronic Projection Display Technology, Larry J. Hornbeck, Jul.–Sep. 1998, Entire Document.
Eight Years of Rapid Prototyping, Terry Wohlers, 1997, Entire Document.
Industry's Amazing New Instant Prototypes, Gene Bylinksy, Reporter Associate, Alicia Hills Moore, Jan. 12, 1998, Entire Document.

* cited by examiner

*Primary Examiner*—John F. Niebling
*Assistant Examiner*—Stacy A Whitmore
(74) *Attorney, Agent, or Firm*—Schmeiser, Olsen & Watts

(57) ABSTRACT

An improved method for creating a three-dimensional object by generating a cross-sectional pattern of energy of an object to be formed at a selected surface of a medium capable of altering its physical state in response to the energy projected or transmitted onto the selected layer. By impinging radiation, particle bombardment, or chemical reaction by a method controlled by a spatial light modulator, successive adjacent cross-sections of the object are rapidly formed and integrated together to provide a step-wise laminar build-up of the desired object creating a three dimensional manifestation from bitmap images of a series of cross-sections of a computer generated model.

22 Claims, 7 Drawing Sheets

METHOD FOR CREATING THREE-DIMENSIONAL OBJECTS BY CROSS-SECTIONAL LITHOGRAPHY

BACKGROUND OF THE INVENTION

This invention relates generally to improvements in the field of rapid prototyping (RP) manufacturing or processes.

RP is a relatively new and promising technology which has seen great advances since its initial application in the 1980's. In one common embodiment known as stereolithography, RP manufacturing comprises a bath of curable liquid wherein some movable point within the bath is subjected to stimulation by a prescribed curing source. As the source is moved with respect to the bath or as the bath is moved with respect to the source, the point which undergoes solidification or curing is constantly made to move. The result is the construction of a solidified mass of cured material contained within the otherwise liquid bath. The region commonly solidified occurs at or very near the surface of the bath in most practical applications. As the liquid is solidified, the solid structure is progressively lowered into the bath allowing the uncured liquid to flow over the surface which is in turn subjected to the same process. By continuing to solidify these very thin layers or laminae, the solid object is built up into its final shape. Bonding of one layer to a previous layer is an inherent property of the process as is known in the art. An adequate description of this process can be found in U.S. Pat. No. 4,575,330 issued to Charles W. Hull.

The main advantages of the RP process are its ability to drastically reduce the time between product conception and final design, and its ability to create complex shapes. More traditional modeling or prototyping is obtained from an iterative generation of a series of drawings which are analyzed by the design team, manufacturing, the consumer, and perhaps others until a tentative final design results which is considered viable. This agreed upon design is then created by casting and/or machining processes. If molds are needed, these must be fabricated as well. The finished prototype is then tested to determine whether it meets the criteria for which the part was designed. The design and review process is often tedious and tooling for the creation of the prototype is laborious and expensive. If the part is complex, then a number of interim components must first be assembled. The prototype itself is then constructed from the individual components.

Use of RP significantly reduces the expense and time needed between conception and completion of the prototype. Commonly, the concept is rendered in CAD (computer aided design). As this process is fully electronic, drawings are not required for fabrication. The CAD system is used to generate a compatible output data file that contains information on the part's geometry. This file is typically converted into a "sliced" data file that contains information on the part's cross-section at predetermined layer depths. The RP control system then regenerates each cross-section sequentially at the surface of the curable resin. The fabricated part can be analyzed by the team or used for various form, fit, and functional tests. Due to the rapid speed and low cost of the process, several designs can be fabricated and evaluated in a fraction of the time and for significantly less than it would take to machine each concept. Since the RP process creates the structure by the creation of very thin laminae, complex components with internal complexities can be easily rendered without requiring the assembly of a plurality of individual components.

A disadvantage of RP other than its initial cost for the technology is that the time associated with the creation of each part can be longer than desired. Since creation of the part occurs in a point-by-point, layer-by-layer process, the time necessary to produce a single part can become excessive. For instance, an arbitrary part of six cubic inches with a 50 percent fill ratio will require approximately six hours to image utilizing current stereolithographic techniques having a 0.005 inch layer build, a laser spot size of 0.010 inches, and a 100 inch per second laser rate assuming no losses. This estimate comprises imaging time alone and does not account for platform movement, sweeping of the resin surface, resin setting time, and mirror inertias that take considerable time between formation of each laminae. Reduction in fabrication times continue to be a desirable goal. Though the above description pertains to the process of stereolithography; the process, as well as the general advantages and disadvantages are similar for other RP technologies.

Another disadvantage of RP specific to stereolithography is that parts produced by this process leave the bath in a very soft state requiring a post-cure process. This too takes time, typically a minimum of 20 minutes. In this soft state, the part is very deformable. Since the part is removed from the bath in a fragile state, supports are often needed to assist in the part's creation and to ensure proper post-curing without significant deformation. In fact, these supports are often vital to parts created by stereolithography especially those parts having overhanging or other unsupported features. The soft state associated with conventional stereolithography is inherently unavoidable for at least two reasons. The first is that the stereolithography though not as rapid as the present invention is still optimized for speed. Thus, increasing the exposure time of the laser at each point on the surface of the resin would significantly increase the processing time of the part. Secondly, to create the part, the laser is rastered without overlapping and the energy at the forming laminae has a gaussian distribution. This traps uncured photopolymer between cured lines. This could be avoided by overlapping the laser paths; however, this would also greatly increase processing time.

Accordingly, the development and production of a faster method to create prototypes and finished parts using RP technology is a desirable goal. Improvement to the existing processes would greatly increase the use of RP and would result in the continued advancement of technology in general due to the increased ease in the creation of complex parts.

SUMMARY OF THE INVENTION

Briefly, the method comprises processing an entire cross-section of the object at one time. By reducing the time needed to stimulate the bath surface to form the laminae, the entire object could be formulated more quickly. Increasing the quantity of material stimulated at each time interval is a preferred way to perform this function. The invention therefore comprises a method of solidifying a discrete quantity of a curable medium by subjecting the surface of said medium to a prescribed energy source and controlling that source in such a fashion to cure only the portion desired while leaving the remainder of the medium uncured. To accurately image an entire cross section at any one time in this manner requires accurate control of the energy source. The means currently preferred to accomplish this is through use of reflective digital light switch technology. This technology was created by Texas Instruments (TI) and is currently referred to as deflectable beam spatial light modulation (SLM). TI refers to the process when applied to its typical applications under their common law trademark as Digital Light Processing (DLP). More specifically, they refer to the critical mechanism used as a Digital Micromirror Device (DMD). U.S. Pat. No. 5,061,049 for a "Spatial light modulator and method" issued on Oct. 29, 1991 to L. Hornbeck of Texas Instruments provides the basic configuration of such a device. Further descriptions of this technology can be found in numerous white papers by TI as well as issued patents including among others, a presentation placed in writing originally given by Larry J. Hornbeck entitled "Digital Light Processing for High-Brightness, High-Resolution Applications" on Feb. 10–12, 1997 in San Jose Calif. A history of the development of the DMD can be found by the same author in an article titled "From cathode rays to digital micromirrors: A history of electronic projection display technology", TI Technical Journal, July–September 1998.

In simplified terms, a DMD is microelectromechanical device comprising a plurality of tiny mirrored surfaces which each can be independently pivoted from a first to a second position. The mirrors are formed into the surface of a semiconductor chip and through the application of an appropriate voltage to the circuitry built under each mirror, that mirror may be made to tilt to one side or another with respect to a plane normal to the semiconductor chip. Further, with respect to some fixed frame of reference, pivoting in one direction causes the mirror to reflect light whereas pivoting in the opposite direction causes the light to be deflected from the fixed frame of reference. As such, to a viewer within the frame of reference, the mirror is either fully on or fully off depending on the direction in which it is pivoted. Each of the mirrors can be independently controlled to be at either of the tilt angles. Since each mirror typically represents a single pixel, a black and white image can be generated by setting the appropriate mirrors to the appropriate position. Both color images and shades of gray are possible with this technology through the use of colored filters for the former and mirror modulation for the latter. The technology associated with color is not important to the present invention other than at an appropriate specific wavelength of the light spectrum best suited to cure an appropriate medium. However, utilizing shades of gray by modulating individual mirrors does have some application to the present invention and will be more appropriately discussed below.

By coupling this spatial light modulation technology to rapid prototyping, great gains are possible in the speed of creation of the prototype. Similar to point by point prototyping, as each succeeding lamina is imaged, a quantity of uncured material is added and selectively cured to form an adjacent lamina. The laminae are adjoined one to the other so that the successive laminae form a continuous solid object comprising the cured material. Using spatial light modulation technology eliminates the need to scan the energy source over each point in turn prior to the solidification of an entire lamina.

In a presently preferred embodiment, by way of example and not by way of limitation, the invention utilizes a gas discharge lamp as the radiation energy source. The invention is also adaptable to any electro-optical energy source capable of being reflected, provided the reflected energy satisfies the requirements of the reactive material. One such example includes lasers. The use of lasers in RP is known in the art since it is currently being utilized for selective laser sintering, stereolithography as described above, and laminated object manufacturing.

In accordance with the invention, a method of generating a three-dimensional object layer by layer from a medium, comprises the steps of providing at least one energy source, and at least one spatial light modulator array having a plurality of individually controlled elements which are each capable of selectively and at least bi-directionally reflecting energy from the energy source. The method further comprises receiving data which corresponds to a two-dimensional cross-section or individual lamina taken from the three-dimensional object desired to be formed and generating control signals to selectively direct a quantity of the individual reflecting elements in either a first or a second direction, one of the directions corresponding to that direction which reflects energy from the energy source off of the spatial light modulator array or arrays and onto the medium. The energy reflected onto the medium causes that portion of the medium in receipt of the reflected energy to undergo a solidification reaction thereby forming a replica in the medium of the two-dimensional cross-section stored in the data. Once the cross-section is satisfactorily solidified, the cross-section is lowered into the medium, additional uncured material is added to the surface, and the process is repeated incrementally for each two-dimensional cross-section until the entire three-dimensional object is replicated in the medium.

One of the primary advantages of the present invention is the projected degree of cure of a part emerging from the resin bath. Since the present invention cures an entire cross-section at the bath's surface at a single time, parts do not contain trapped, uncured resin. Additionally any increase in exposure time, if required, would be minimal. The predicted imaging time for a single lamina created by the present invention of cross-sectional lithography is estimated to be on the order of one second versus 18 to 36 seconds for the same lamina utilizing conventional stereolithography. Increasing exposure by 20 percent would equate to adding roughly three minutes to the creation of a 1000 laminae part by cross-sectional lithography whereas it would add 1.2 hours to the creation of the same part utilizing conventional stereolithography. Since cross-sectional lithography cures an entire lamina in one increment, and since it does not require raster filling of the image, surface geometry is irrelevant with respect to time. As such one object of the present invention is to provide a method to substantially reduce the time necessary to generate a three-dimensional object utilizing an RP process.

It is further an object of the present invention to provide a method for imaging an entire cross-section of the object at each time interval by a process now known as cross-sectional lithography.

It is further an object of the present invention to improve the speed of existing rapid prototyping technologies.

It is another object of the present invention to provide a method of reflecting an energy source in order to image an entire cross-sectional area of material simultaneously thereby creating a complete lamina of solidified material comprising one layer in a plurality of stacked laminae forming the solid object.

It is further an object of the present invention to provide a method adaptable for use in other RP processes which utilize beam sources conducive to reflection or transmission in the case of light valve technology such as electron and particle beam.

Yet a further object of the present invention is to provide a method adaptable for use in RP processes which utilize any wavelength of radiation conducive to reflection from the electromagnetic spectrum.

Yet another object of the present invention is to improve the rapidity, economy, and desirability of rapid prototyping technology.

Another object is to provide a process which can create parts exhibiting improved final tolerances, reduction in material waste, reduction or elimination in the reliance of structural supports or posts, and a reduction or elimination of post-curing.

Still a further object of the present invention is to improve the accuracy of the process through the ability to precisely modulate the transmitted energy of the energy source.

Still further objects are to provide the ability to create parts in any size with any accuracy through the use of a lens system. These and other objects of the present invention will become more readily apparent from the detailed description given hereafter. However, it should be understood that a detailed description and specific examples, while indicating preferred embodiments of the invention, are given by way of illustration only, since various changes and modifications within the spirit and scope of the invention will become apparent to those skilled in the art from this description.

BRIEF DESCRIPTION OF THE DRAWINGS

The invention can be more fully understood from the following detailed description thereof in connection with accompanying drawings described as follows.

DESCRIPTION OF THE PREFERRED EMBODIMENT(S)

Figure 1:
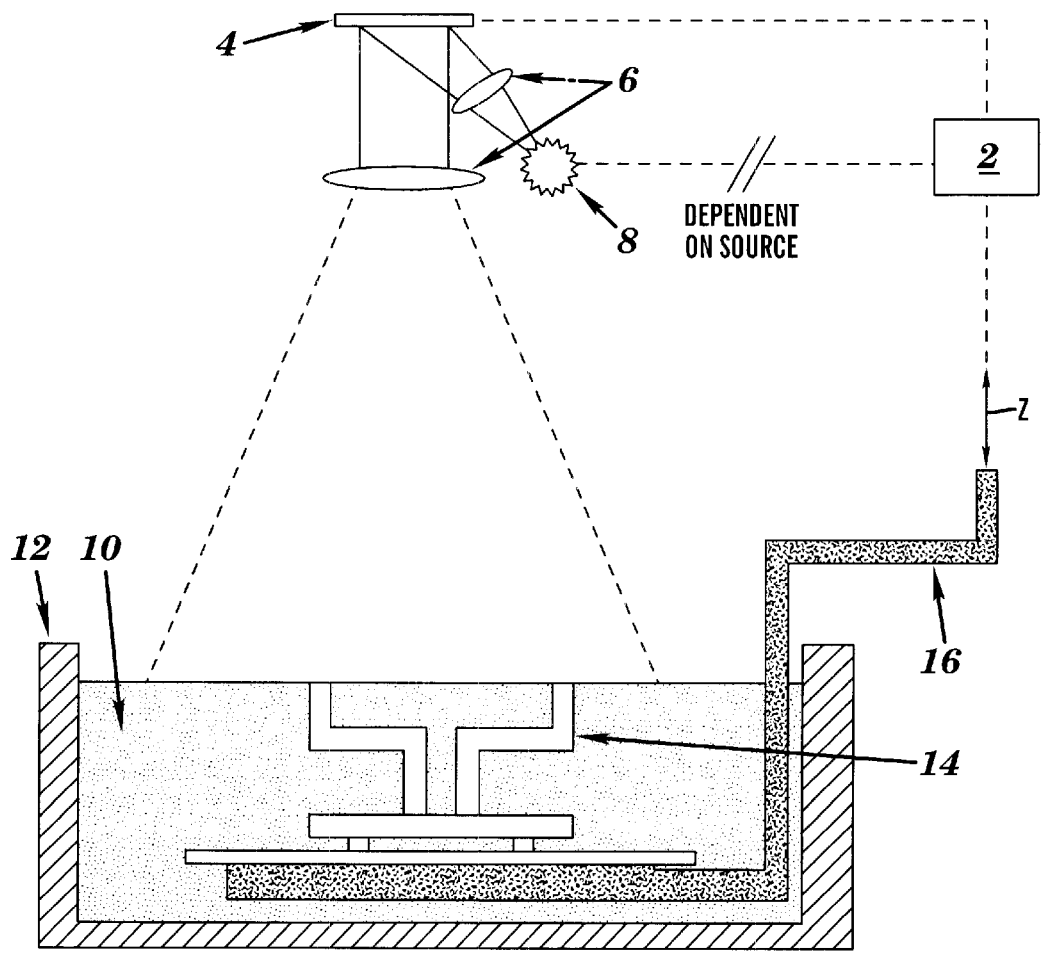
FIG. 1 is a simplified block diagram, schematic and elevational section view of a recently invented system suitable for practicing the invention, comprising, in order, from bottom to top, a container, a photocurable resin, an elevator platform, a created part, a spatial light modulator, specifically a digital micromirror device and appropriate projection lenses, and a computer control system.

Throughout the following detailed description, similar reference characters refer to similar elements in all figures of the drawings.

Referring now to the drawings, and particularly to FIG. 1 thereof, there is shown a simplified block diagram of an overall stereolithography system suitable for practicing the present invention. In general such a system comprises at least a computer control system 2, a spatial light modulator 4, appropriate projection lenses 6, an energy source 8, a solidifiable resin 10, a container 12 to hold said resin 10, a created part 14, and an elevator platform 16 to move the created part with respect to the resin 10 and the spatial light modulator 4.

More specifically, the computer control system 2 includes a computer, data storage, CAD data, and appropriate interface control software to process any one of CAD solid model data, geometry output data, and a "sliced" data file. A STereoLithography or STL data file, is the current standard used to represent the surface of an object as a mesh of polygons, typically triangles. These triangles are made to completely form the inner and outer surfaces of the object. The smaller the triangles, the greater the accuracy of the object formed. This is especially true in creating curvatures. The STL file contains data for each of the X, Y, and Z coordinates of the three vertices of each of the triangles on the boundary surface. The representation also includes a unit length normal vector for each triangle. The normal points away from the solid which the triangle is bounding and indicates slope from the boundary surface.

The interface control software comprises the means for processing the part geometry into a suitable image. This image is transmitted digitally to the spatial light modulator 4. Each mirror surface on the spatial light modulator 4 represents a pixel or other suitable discrete quantity of information. As such, the interface control software transmits the image to the spatial light modulator 4 in a form capable of representing each pixel or other suitable discrete quantity of information, one such form comprising a bitmap image. The entire bitmap image, represents an individual lamina of the created part 14. The container 12 is filled with, in the preferred embodiment, a UV curable liquid resin 10 or the like. The energy source 8 provides a source of ultraviolet or UV light may be operably controlled by the computer control system 2 if desired. Regardless, the UV light is directed towards the spatial light modulator 4. The spatial light modulator 4 is directed by suitable algorithms from the computer control system 2 to tilt specific mirrors in at least one of two directions. The first direction for ultimately reflecting energy onto the surface of the liquid resin 10, the second to deflect energy away from the surface of the resin 10. Proper manipulation of the mirrors causes an image stored within the data storage component of the computer control system 2 to be ultimately reflected onto the surface of the resin 10. The surface of the UV curable resin 10 is maintained at a constant level in the container 12, as the energy is reflected onto it at sufficient intensity to cure the liquid and convert it to a solid material.

To increase or more intensely focus the energy from the energy source 8, the lens 6 or a plurality of appropriate lenses can be placed between the energy source 8 and the spatial light modulator 4 to focus the energy onto the spatial light modulator. Likewise, an appropriate lens 6 or lenses can be placed between the spatial light modulator 4 and the resin 10 to project the energy onto the surface of the resin 10. In this manner, a reproduction of the image is created on the surface of the resin 10. This reproduction comprises a quantity of solidified resin correlating to a single lamina of the three-dimensional part 14.

As the liquid resin 10 cures into a solid lamina the elevator platform 16 is moved down from the surface in a programmed manner by any suitable actuator. In this way, the solid material that was initially formed is taken below the surface of the resin and new liquid resin 10 is allowed to or is made to flow over the cured lamina. A portion of this new liquid is, in turn, converted to solid material by the programmed energy source 8 and the spatial light modulator 4. This new material due to its inherent properties adhesively connects to the material below it. Precise level control of the fluid is required to properly form laminae. Fluid level can be controlled through pumping, mechanical actuation, or overflow. This process is continued until the entire three-dimensional part 14 is formed. The part 14 is then removed from the container 12, and the apparatus is ready to produce another part. Another identical part can then be produced, or some new object can be made by changing the program in the computer control system 2.

The elevator platform 16 which is used to support and hold the cured part 14 as it is being formed, as stated must be able to move at least up and down as required. Typically, after each lamina is formed, the part 14 is lowered into the resin 10 to some point below the level of the next layer to allow the uncured liquid resin 10 to more readily flow over the part. The elevator platform is then raised to the correct level prior to directing the energy onto the resin 10. The requirements for the elevator platform 16 are similar to other stereolithography systems in that it can be moved in a programmed fashion at appropriate speeds, with adequate precision, and that it is powerful enough to handle the weight of the part being formed. The elevator platform 16 can be mechanical, pneumatic, hydraulic, or electrical and may also use optical or electronic feedback to precisely control its position.

A pump (not shown) may be used to maintain a constant level of the liquid resin 10 in the container 12. Appropriate level detection system and feedback networks, well known in the art, can be used to drive a fluid pump or a liquid displacement device, which is moved out of the fluid medium as the elevator platform 16 is moved further into the fluid medium, to offset changes in fluid volume and maintain constant fluid level at the surface. Other alternatives exist which enable the energy reflected from the spatial light modulator 4 to automatically remain in sharp focus at the working surface. All of these alternatives can be readily achieved by appropriate data operating in conjunction with the computer control system 2.

Looking now to FIG. 2 as a representative example, this step-by-step, layer-by-layer process is illustrated. FIG. 2a depicts the part 14 at some point in time (t) as the cross-sectional laminae are being added to the part 14. FIG. 2b depicts a single lamina comprising two discrete discontinuous sections 100 and 102, at time (t+1). The spatial light modulator 4 and lenses 6 if used projects each of these and similar cross-sections onto the surface of the curable resin 10 for the appropriate length of time needed to cure the resin to some predetermined depth, after which time the cross-sections forming a single lamina are lowered by operably manipulating the elevator platform 16. A quantity of the uncured resin 10 is allowed to or is made to flow over the cured lamina and the process is repeated with the next successive bitmap image.

Figure 2D:
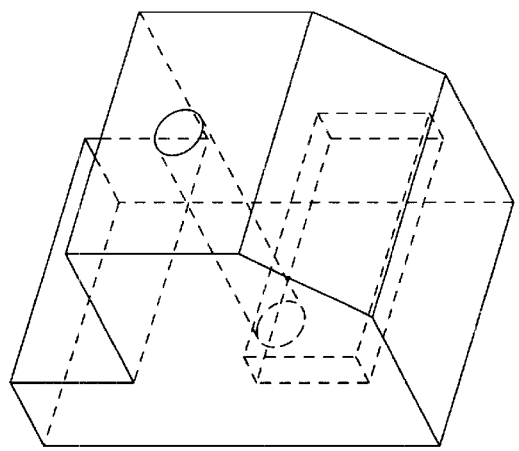
FIG. 2 depicts the laminae slicing required to obtain a completed part from the FIG. 1 invention at various points in time.
Figure 2A:
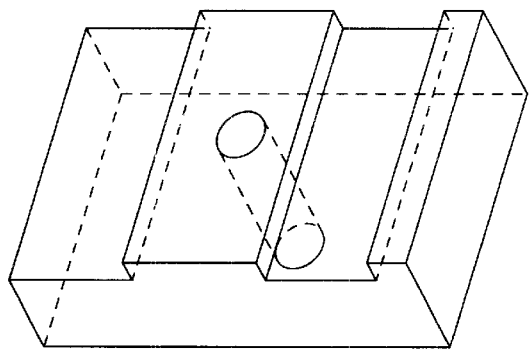
Figure 2B:
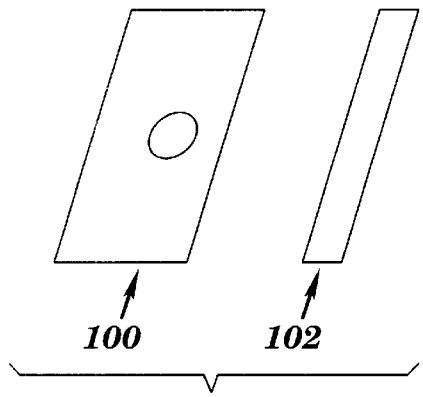
Figure 2C:
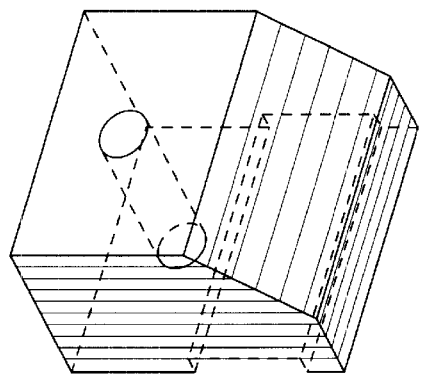

FIG. 2c depicts a plurality of these laminae over a time (t) to a time (t+n). FIG. 2a illustrates part 14 in mid-production. As can be seen sections 100 and 102 form the next sequential lamina which will be the base of FIG. 2c which represents additional sections to be added layer-by-layer. Each layer in turn comprises a complete bitmap image layered on top of the preceding layer. FIG. 2d comprises the completed part 14 made from the sectional parts depicted in FIGS. 2a, 2b, and 2c. These FIGS. depict the process in that the control software slices the three-dimensional representation of the part 14 into an ordered series of two-dimensional cross-sections of some predetermined thickness in the z-direction. For instance, were the part four inches in height and each two-dimensional lamina was set to 0.010 inch, then the finished part 14 would comprise 400 laminae each stacked and bonded one atop the other.

Many liquid state chemicals are known which can be induced to change to solid state polymer plastic by irradiation with ultraviolet light (UV) or other forms of synergistic stimulation which form a desired reaction with the medium. The synergistic stimulation includes but is not limited to electron beams, visible or invisible light, reactive chemicals applied by ink jet or via a suitable mask. Some such chemicals are currently distributed under various brand names by 3D Systems/Ciba-Geigy, DuPont, Allied Signal, and LocTite. These and similar chemicals identified are typically limited in that each must be cured by an energy source with a specific wavelength. Since each has differences chemically, each afford different physical properties to the finished part as well as to the actual creation process.

Since the preferred embodiment of the present invention utilizes an ultraviolet UVA or UVB lamp source which has greater bandwidth on the electromagnetic spectrum, the type of resin 10 is not as limiting as it would be for a more narrowly focus spectrum energy source. In fact the present invention is not limited to any specific type of lamp which enables a greater quantity of the electromagnetic spectrum to be available for the cross-sectional lamination process. Whereas prior stereolithography techniques relied upon resins optimized for very specific wavelengths, the development of future resins as well as the selection of presently available resins is no longer bound by such concerns. By using the present invention, the part 14 can be optimized to meet some desired physical property or properties.

As in previous versions of stereolithography, for cross-sectional lithography to successfully work, there must be good adhesion from one lamina to the next. Hence, the resin 10, must have several important properties. It must cure fast enough with the available UV light source to allow practical object formation times. It must be adhesive, so that successive layers will adhere to each other. Its viscosity must be low enough so that fresh liquid material will quickly flow across the surface when the elevator moves the object. It should absorb UV so that the film formed will be reasonably thin. It must be reasonably soluble in some solvent in the liquid state, and reasonably insoluble in that same solvent in the solid state, so that the object can be washed free of the UV cure liquid and partially cured liquid after the object has been formed. It should be as non-toxic and non-irritating as possible.

Though more options are available than previously were, the cured part 14 must also have desirable properties once it is in the solid state. These properties depend on the application involved, as in the conventional use of other plastic materials. Such parameters as color, texture, strength, electrical properties, flammability, and flexibility are among the properties to be considered. In addition, the cost of the material will be important in many cases.

As indicated above, the preferred embodiment utilizes a UVA or UVB lamp source. The output intensity of the source should be as high as possible since the reaction within the resin 10 is dependent upon the amount of energy that is absorbed at the surface of the resin. The more energy provided, the faster the reaction and the quicker the part 14 can be constructed. Depending upon the output mode of the energy source, i.e., whether it is via a port, light pipe, fiber, or beam, a system of the above enumerated lenses 6 may be required to focus the energy onto the surface of the resin 10.

For the sake of illustration of the scalability of the spatial light modulator 4, assume a digital micromirror device (DMD) is utilized. Currently DMDs are available which provide a 1280 by 1024 array of 1,310,720 individual mirrors, each mirror being 16 microns square with a 1 micron gap between each mirror in both directions. This gives each mirror a 17 micron effective size from center to center. The gap is insignificant, as adjacent mirrors reflecting energy onto the surface of the resin 10 will form a solid part. Therefore, for simplicity, 17 microns is used when determining the scaling necessary for selection of an appropriate lens 6.

The scaling of the mirrors determines the achievable tolerance at the resin surface as well as the size of the part that can be produced. For instance, in order to achieve standard machining tolerances of plus or minus 0.005 inches, a projection lens is required to scale the energy reflected from each mirror from 17 square microns to 254 square microns, which equates to 0.010 square inches. This requires 14× magnification by the lens 6. Given the array size of 0.857 by 0.685 inches, the maximum achievable part from the 1280 by 1024 DMD array with tolerances of plus or minus 0.005 inches would have a maximum cross section of 12.86 by 10.28 inches.

Figure 3:
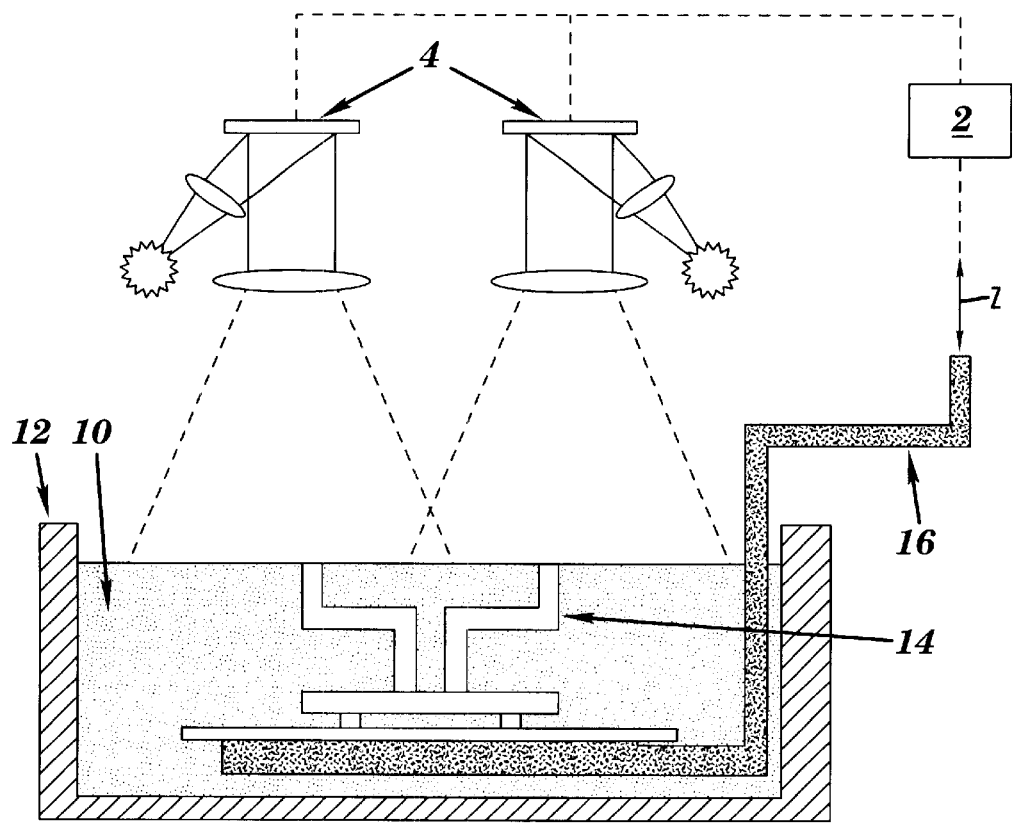
FIG. 3 depicts the FIG. 1 invention utilizing multiple spatial light modulators.

Now resorting to FIG. 3 it can be seen that more than one spatial light modulator 4 can be linked in order to process larger cross-sections or provide improved tolerances. The concept is identical to that explained above. The computer control system 2 would simply direct each spatial light modulator 4 to pivot its mirrors appropriately. The plurality of such mirrors forming the complete cross-sectional image of a single lamina.

Figure 4:
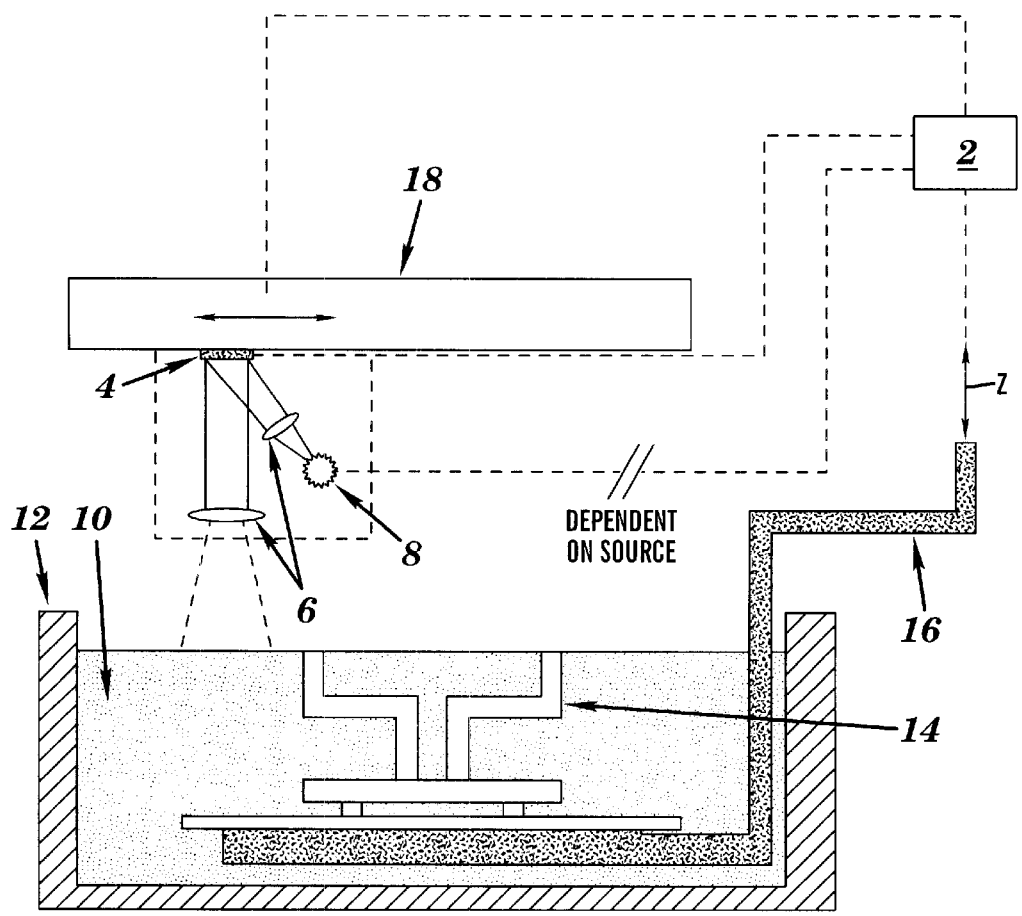
'FIG. 4 depicts the FIG. 1 invention with a moving spatial light modulator.

FIG. 4 depicts another alternative to the FIG. 1 embodiment. This embodiment utilizes an overhead translation apparatus 18 to translate the spatial light modulator 4 in a linear fashion over the container 12. The preferred means to accomplish this is to utilize a DMD several mirrors in width by several hundred mirrors in length and to translate the DMD over the container 12 along the width of the DMD. The computer control system 2 would simply direct the DMD to pivot its mirrors appropriately as it travels over the resin 10. This embodiment would also work with a plurality of such DMDs as described above in conjunction with FIG. 3.

Figure 5:
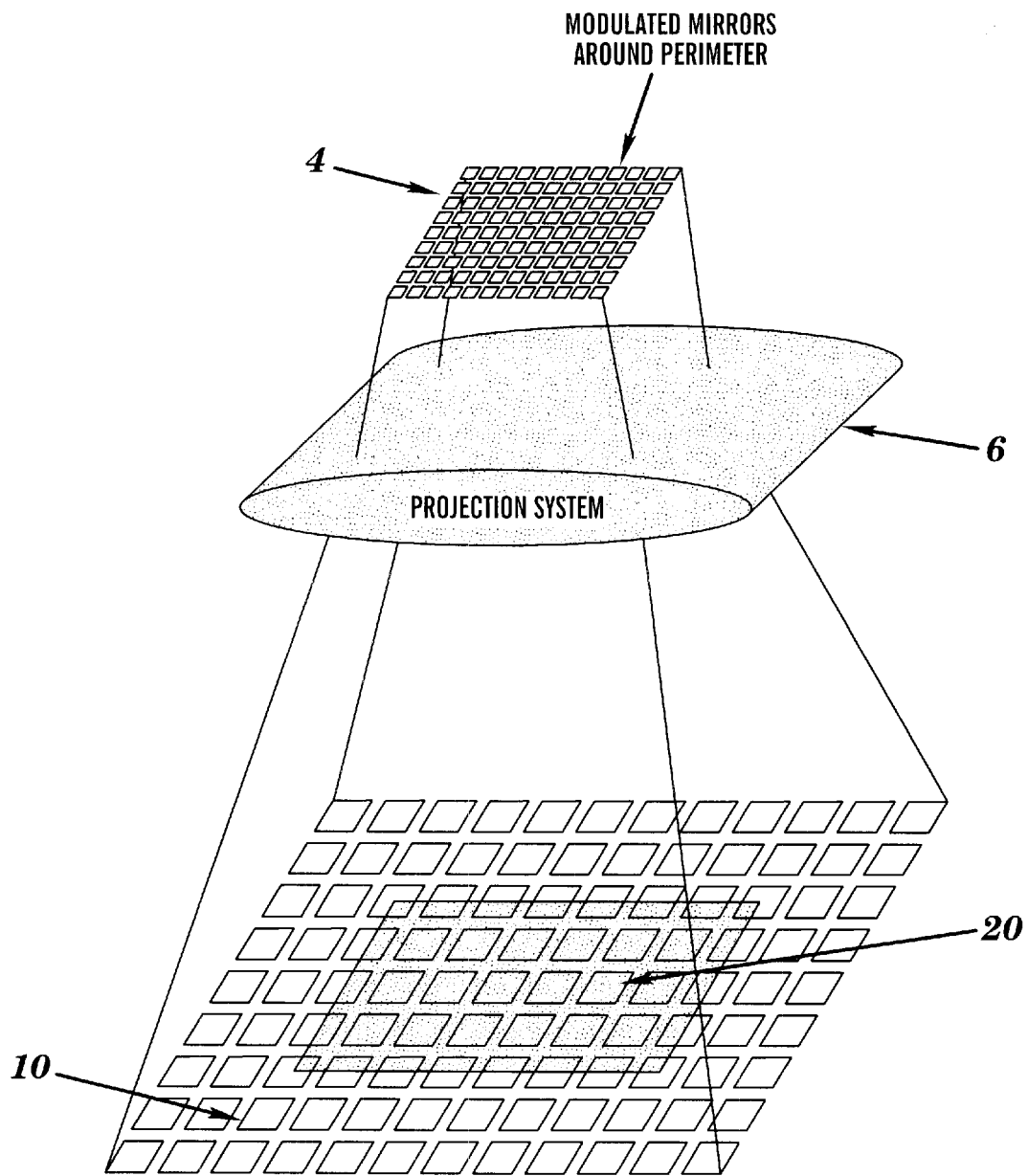
FIG. 5 depicts the FIG. 1 invention wherein at least some of the mirrors are modulated between a reflective and deflective condition.
Figure 6:
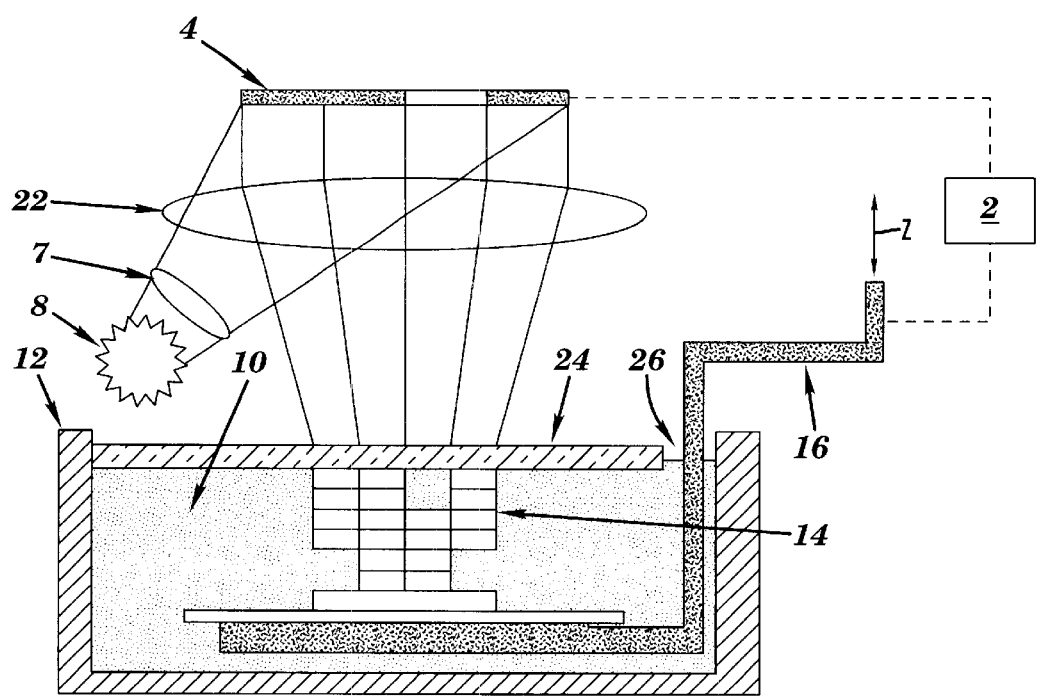
Figure 7:
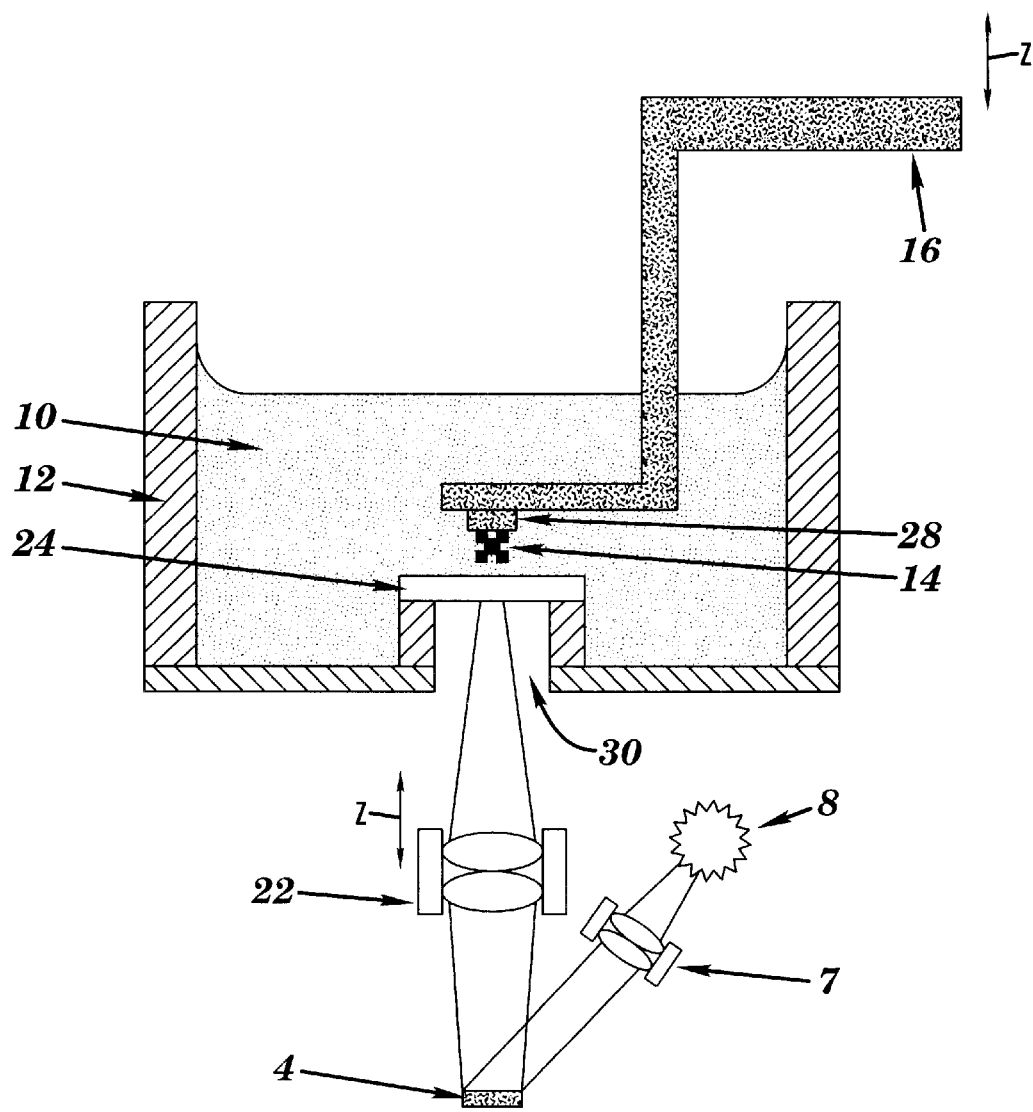

Turning to FIG. 5, the spatial light modulator 4 is depicted along with one of the lenses 6, along with an image 20 projected onto the surface of the resin 10. This FIG. depicts a technique in which the outside mirrors representing the actual outside boundaries of the image are modulated between "on" and "off". Visually this would create a specific shade of gray, its intensity dependent upon how long the mirror were reflecting light versus deflecting light. Since the mirrors have this ability to be modulated at very high rates of speed, utilizing gray shading would achieve more desirable curing characteristics in the resin. For instance, if a dimension across some area is required to be 0.254 inches, and the array is using a projection system wherein each individual mirror is scaled to 0.010, then reflecting 25 adjacent mirrors should produce a line with a dimension of 0.250 inches, assuming perfect projection of the energy source 8 and reaction of the resin 10. Therefore, in order to create the line 0.254 inches, the twenty-sixth mirror can be rapidly modulated such that after post-processing, the resin cured 0.004 inches beyond the 0.250 inches correlating to the 25 adjacent mirrors. Additionally, this modulation method can be used to create thinner laminae, or areas of a specific lamina.

Another possible modification to each of the systems which is not depicted but is contemplated would be to utilize a high speed strobe as the energy source 8. A high speed strobe has distinct advantages given the digital nature of the spatial light modulator 4 and the high intensity energy which can be directed at the resin 10 for brief intervals of "on" time due to the nature of a modulated energy source. Appropriate control is necessary by the computer control system to operably correlate and synchronize the strobe energy source 8 with the mirrored surfaces of the spatial light modulator 4.

As such the method of making and using the device detailed above constitute the inventor's preferred embodiment and alternate embodiments to the invention. The inventor is aware that numerous configurations of the device as a whole or some of its constituent parts are available which would provide the desired results. While the invention has been described and illustrated with reference to specific embodiments, it is understood that these other embodiments may be resorted to without departing from the invention. Therefore the form of the invention set out above should be considered illustrative and not as limiting the scope of the following claims.

I claim:

1. A method of generating a three-dimensional object out of a medium capable of selective solidification upon exposure to synergistic stimulation, comprising the steps of:
    providing at least one spatial light modulator array having a plurality of individually controlled pixel elements;
    providing a source of said synergistic stimulation;
    directing said synergistic stimulation upon said spatial light modulator array(s);
    selectively activating a plurality of said pixel elements wherein said activated pixels reflect said synergistic stimulation onto corresponding surface portions of said medium;
    maintaining said synergistic stimulation directed at said surface until the surface portions of said medium exposed to said synergistic stimulation solidify to form at least a partial lamina layer;
    lowering said lamina layer into said medium by a first distance;
    raising said lamina layer by a second distance, wherein the second distance is less than the first distance to form a next surface portion to be exposed; and
    repeating the maintaining, lowering and raising steps until the maintaining step forms a final lamina layer, such that adjacent lamina layers are bonded with each other.

2. The method of claim 1 further comprising the step of first translating said spatial light modulator array(s) progressively over the medium after solidification of said partial lamina prior to lowering said lamina layer into said medium in order to solidify an adjacent lamina portion of said medium through said selective synergistic stimulation.

3. The method of claim 1 wherein said spatial light modulator array further comprises a digital micromirror device (DMD).

4. The method of claim 1 wherein said spatial light modulator array further comprises an image light amplifier device (ILA).

5. The method of claim 1 wherein said spatial light modulator array further comprises a direct image light amplifier device (DILA).

6. The method of claim 1 further comprising the step of amplifying said synergistic stimulation reflected from said activated pixel elements of said light modulator array through a lens onto said medium.

7. The method of claim 1 further comprising the step of modulating a portion of said pixel elements to cycle between an activated and deactivated mode, wherein said modulation causes a migration of solidification of said medium corresponding to said modulated pixel elements.

8. The method of claim 1 wherein said synergistic stimulation is rapidly energized and de-energized thereby creating a strobe effect.

9. A method of generating a three-dimensional object layer by layer from a medium, comprising the steps of:
    providing at least one energy source;
    providing at least one spatial light modulator array having a plurality of individually controlled elements each capable of selectively reflecting or transmitting energy form said energy source(s);

receiving data corresponding to a two-dimensional cross-section of the three-dimensional object;

generating control signals for selectively directing a quantity of said elements in a first direction;

reflecting or transmitting energy from said energy source off or through said spatial light modulator array(s) and onto corresponding surface portions of said medium, whereupon said portions in receipt of said reflected energy are solidified thus forming a replica in the medium of the two-dimensional cross-section;

lowering said two-dimensional cross-section into said medium by a first distance;

raising said two-dimensional cross-section by a second distance, wherein the second distance is less than the first distance to form a next surface portion to be exposed; and repeating the reflecting, lowering and raising steps incrementally for each two-dimensional cross-section until the entire three-dimensional object is replicated.

10. The method as defined in claim 9 wherein the first direction is that direction in which said energy is directed to reflect form said source off of those elements tilted in the first direction and onto the medium.

11. The method as defined in claim 9 wherein the first direction is that direction in which said energy is directed to reflect from said source off of those elements tilted in the first direction and is further directed away from the medium.

12. The method of claim 9 further comprising the step of translating said reflected energy from said spatial light modulator array(s) progressively over the medium to adjoin a plurality of two-dimensional cross-sections prior to lowering said two-dimensional cross-sections onto said medium.

13. The method of claim 9 further comprising the step of translating said reflected energy from said spatial light modulator array(s) progressively over the medium to create a two-dimensional cross-section larger than the two-dimensional cross-section capable of being reflected off of said spatial light modulator array(s).

14. The method of claim 9 further comprising the step of adjoining a plurality of two-dimensional cross-sections each concurrently solidified in said medium by a dedicated said spatial light modulator array.

15. The method of claim 9 further comprising the step of amplifying said energy reflected from said individual elements through a lens prior to directing said energy onto said medium.

16. The method of claim 9 further comprising the step of modulating at least some of said elements bi-directionally to cyclically reflect and deflect said energy from said medium.

17. The method of claim 9 wherein said energy source comprises a thermal light source.

18. The method of claim 9 wherein said energy source comprises a coherent light source means.

19. The method of claim 9 wherein said energy source comprises a laser.

20. The method of claim 9 wherein said energy source comprises at least one wavelength selected from the electromagnetic spectrum.

21. The method of claim 9 wherein said energy source is rapidly activated and de-activated thereby creating a strobe effect.

22. A method of generating a three-dimensional object out of a medium capable of selective solidification upon exposure to synergistic stimulation, comprising the steps of:

providing a container having the medium therein and a support for the object within the container, wherein a surface of the support is operatively positioned parallel with respect to at least one surface of the medium;

having a gap between a wall of the container and the support such that the medium flows through the gap when the support is displaced relative to the surface of the medium;

providing at least one spatial light modulator array having a plurality of individually controlled pixel elements;

providing a source of said synergistic stimulation;

directing said synergistic stimulation upon said spatial light modulator array(s);

selectively activating a plurality of said pixel elements wherein said activated pixels reflect said synergistic stimulation onto corresponding surface elements of said medium;

maintaining said synergistic stimulation directed at said surface until the surface portions of said medium exposed to said synergistic stimulation solidify to form at least a partial lamina layer;

displacing said support into said medium to form a next surface portion to be exposed; and repeating the maintaining and lowering steps until the maintaining step forms a final lamina layer, bonding adjacent lamina layers with each other.

\* \* \* \* \*